Patented July 6, 1948

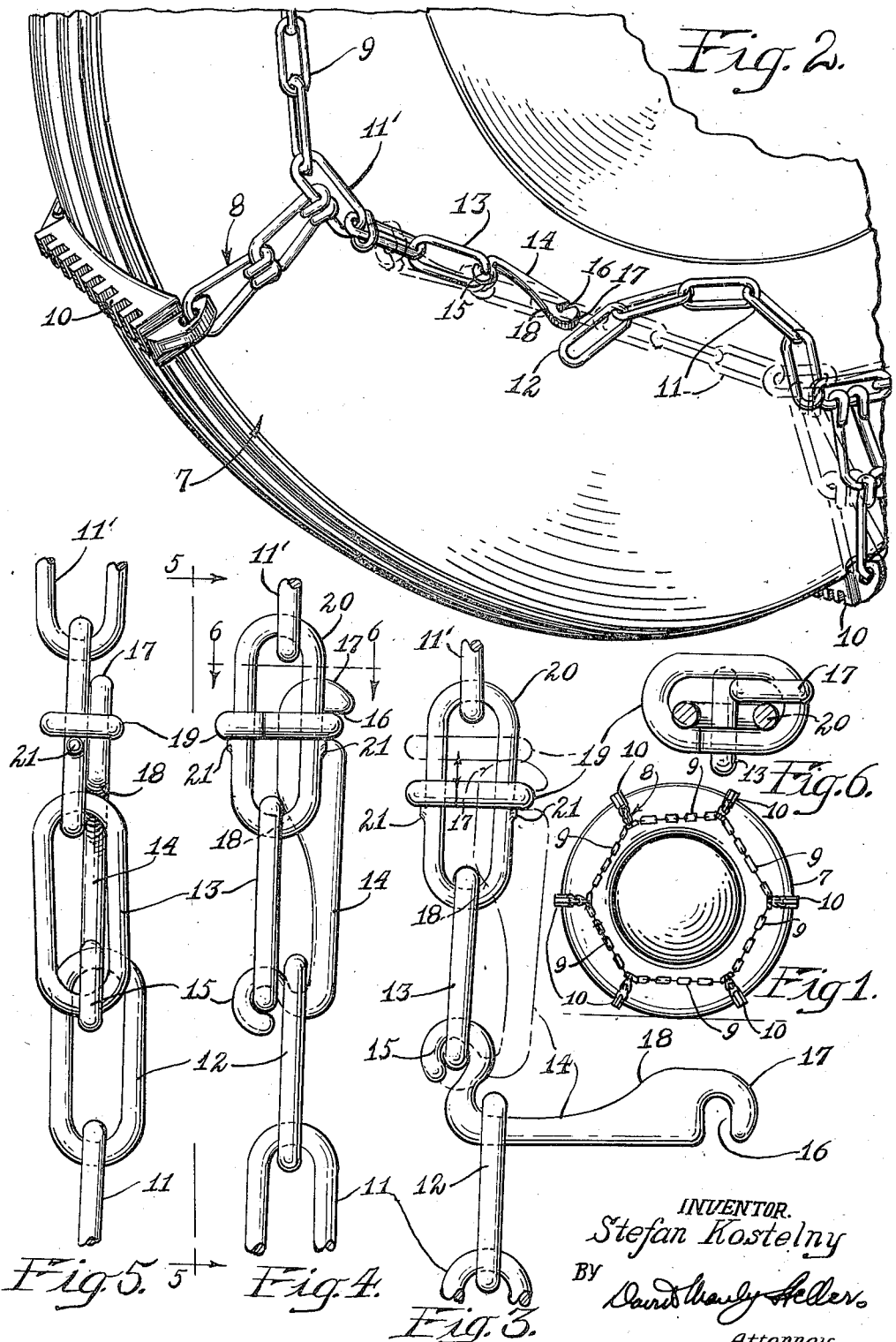

2,444,513

UNITED STATES PATENT OFFICE 2,444,513

ANTISKID CHAIN SECURING DEVICE

Stefan Kostelny, Chicago, Ill.

Application March 5, 1947, Serial No. 732,439

3 Claims. (Cl. 152—241)

My invention relates to anti-skid chains and devices of similar nature for use on slippery pavements in order to increase the frictional engagement of a vehicle wheel with a skiddy or slippery pavement. This application is an improvement over my copending patent application, Serial Number 666,460, filed May 1, 1946.

An important object of my invention is to provide anti-skid chain means and traction elements, or units, which may be readily attached to a vehicle wheel, or readily detached therefrom, when not needed.

An important object of my invention being the provision of a locking and latching means which is quickly engaged and locked in position and, at the same time, will tautly secure the chain about the vehicle wheel so as to prevent leaving slack portions of the chain which create slap against the fenders, and have a tendency of becoming more and more distended from wear and use.

It is therefore a prime object of my invention to provide slack tightening means which will insure a tight fit of an anti-skid chain structure to a vehicle wheel; at the same time preventing that condition from becoming aggravated after continued use.

Another object of my invention is to provide a locking and latching means for anti-skid chain units, which is practical in construction, efficient in its operation toward the purposes for which it is purported to be used, and of such simple elemental construction as to warrant economical manufacture thereof in quantity production.

Other features and ancillary objects inherent in my invention will become apparent from an examination of the accompanying drawings, having further reference to the ensuing description, wherein like symbols are used to designate like parts, and in which:

Fig. 1 is a front view of a vehicle wheel and the skid chain structure attached thereto.

Fig. 2 is an enlarged quadrant or section of a vehicle wheel, showing the important features of the locking and latching means, clearly depicting the general structure thereof.

Fig. 3 is a front view of the latching means preparatory to closing position, in full lines, and showing the same in closed position in dotted lines.

Fig. 4 shows the latching means in closed and locked engagement and is a view similar to Fig. 3.

Fig. 5 is an end view of Fig. 4 looking in the direction of arrows 5—5.

Fig. 6 is a transversal sectional view taken along the lines 6—6 of Fig. 4.

Referring to the various views, my invention is best illustrated in Fig. 1, it being generally designated 8, and is attached to a vehicle wheel generally designated 7. The anti-skid chain unit is designated 9, it being secured to the anti-skid or traction elements which are of a toothed nature designated 10, and more clearly described in the aforesaid co-pending patent application.

The chain structure 9 is preferably hexagonal in shape and is made up of six chain portions, or laterals, and six traction elements 10. The chain generally designated 8 is comprised of six lateral sections 9 and six traction elements 10. One of the laterals 9 is broken so as to connect the locking and latching means comprising the important feature of this particular invention.

In my former application, I disclosed four traction elements 10 and a chain of four sections. I have found, by increasing the number of laterals of the chain to six, that I obtain a better fit. I can also attach the chain and remove it without jacking up the wheel to which the chain or traction units are to be attached. However, with my former invention, I have found that I do not obtain as tight a closure as I do with my present locking and latching means. The resultant effects, in the former instance, being that the original looseness of the chain and, because of its engagement with the pavement, it tends to become more and more distended and becomes looser from continual use, developing a great amount of slack and relative movement between the chain and the wheel; thus, defeating the anti-skid principle which makes a traction unit of this type inefficient.

I have, therefore, recognized that it is essential to have a tighter fitting arrangement and have subdivided the chain and structure to six lateral sections to permit of a tight fitting relationship by providing the latching means illustrated in Fig. 3.

Referring to those figures, I show a latching element 14 which is provided with an eye 15 articulately secured to one end of one link 13 of one section of the lateral, which is broken; link 12 of the other section on the same lateral being slipped into by the latch 14, as indicated in Fig. 3, preparatory to locking, latching, and tightening the chain section by means of drawing together the links 12 and 13 of the section 11 and 11'. The latch 14 is provided with an enlarged portion having a cam-like upper surface 17 of arcuate shape and a rear hump portion 18. Directly below the head latch 14 engages opening 16. The latch 14 is swung about its pivot on the lower portion of the link 13 to the dotted lines, indicated in Fig. 3, and simultaneously with that motion the loose locking link 19 is caused to be cammed upwardly to the dotted position as shown and, when the latch has been moved sufficiently to the left, the chain link 19 will drop to the position indicated by the full lines in Fig. 3 to engage the opening 16. The rear hump portion 18 will abut against the upper portion of the chain link 13, thus providing a locking arrangement both ways which will not accidentally come apart.

To foolproof the locking action and to make it more convenient, the link 20 has two protuberances 21 which will prevent the safety chain link 19 from falling lower than indicated, so that in the position, shown in Fig. 3, the mere rotation of lateral 14 to its closed position will automatically cam upwardly the chain link 19 and, then, allow the same to drop and furnish a locking means with the slot 16, the link 13 resting against the hump portion 19 heretofore mentioned.

In removing the same, the latch 14 is moved to the left past the dotted position so as to permit moving the link 19 upwardly to the dotted position shown. Then, the latch 14 may be moved outwardly toward the full lines and drawn out of the link 12 to disengage the same. A latching means of this type is provided on the front section of the chain for the wheel in Fig. 1, and another one is provided on the back portion so that the chain may be tightly and tautly secured to function efficiently.

It goes without saying that, in attaching a chain of this type tautly to begin with, all difficulty arising from loosely mounted chains is necessarily obviated and, hence, a more efficient traction means is provided.

It should be understood that I am not confined to specific forms, dimensions, or materials herein described, as non-essential changes or modifications may be made without departure from my invention; all such changes and modifications to be contemplated by me as within the scope and purview of the appended claims.

Having thus disclosed and revealed my invention, what I claim as new, and desire to secure by Letters Patent, is:

1. In an anti-skid chain structure, latch means for releasably and tautly securing the said anti-skid chain structure about a pneumatic tire, the said latch means including, a latch element articulately secured to the terminal link of one portion of the said anti-skid chain structure, a cam portion on the top edge of the said latch means, a locking slotted portion below the said cam portion and located on the forward edge of the said latch means, a hump portion on the rear edge of the said latch means adapted to abut the said terminal link in locked position, a locking chain link mounted slidably and transversely on the chain link adjacent the said terminal link adapted to enter with one of its ends into the said locking slotted portion, and protuberant means on the edges of the said chain link adjacent the said terminal link to maintain the said locking chain link within cam actuating range of the said latch means.

2. In an anti-skid chain structure, latch means for releasably and tautly securing the said anti-skid chain structure about a pneumatic tire, the said latch means including, a latch element articulately secured to the terminal link of one portion of the said anti-skid chain structure, a cam portion on the top edge of the said latch means, a locking slotted portion below the said cam portion and located on the forward edge of the said latch means, a hump portion on the rear edge of the said latch means adapted to abut the said terminal link in locked position, a locking chain link mounted slidably and transversely on the chain link adjacent the said terminal link adapted to enter with one of its ends into the said locking slotted portion, and protuberant means on the edges of the said chain link adjacent the said terminal link to maintain the said locking chain link within cam actuating range of the said latch means, the said latch means when articulated 90° toward latching and locking position effectuating close and secure envelopment of the said pneumatic tire preventing objectionable slap from impairing the efficiency of the said anti-skid chain structure.

3. In an anti-skid chain structure, latch means for releasably and tautly securing the said anti-skid chain structure about a pneumatic tire, the said latch means including, a latch element articulately secured to the terminal link of one portion of the said anti-skid chain structure, a cam portion on the top edge of the said latch means, a locking slotted portion below the said cam portion and located on the forward edge of the said latch means, a hump portion on the rear edge of the said latch means adapted to abut the said terminal link in locked position, a locking chain link mounted slidably and transversely on the chain link adjacent the said terminal link adapted to enter with one of its ends into the said locking slotted portion, and protuberant means on the edges of the said chain link adjacent the said terminal link to maintain the said locking chain link within cam actuating range of the said latch means, the said latch means being removably secured to the terminal link of the said anti-skid chain structure, the said latch means when articulated 90° toward latching and locking position effectuating close and secure envelopment of the said pneumatic tire preventing objectionable slap from impairing the efficiency of the said traction elements.

STEFAN KOSTELNY.

REFERENCES CITED

The following references are of record in the file of this patent:

UNITED STATES PATENTS

| Number | Name | Date |
|---|---|---|
| 1,283,396 | Buchanan | Oct. 29, 1918 |
| 1,290,474 | Achberger | Jan. 7, 1919 |
| 1,894,914 | Stahl | Jan. 17, 1933 |

FOREIGN PATENTS

| Number | Country | Date |
|---|---|---|
| 116,411 | Austria | Feb. 25, 1930 |
| 786,078 | France | Aug. 26, 1935 |